(12) United States Patent
McLeod et al.

(10) Patent No.: US 10,313,721 B1
(45) Date of Patent: *Jun. 4, 2019

(54) LIVE STREAMING MEDIA CONTENT USING ON-DEMAND MANIFESTS

(71) Applicant: Amazon Technologies, Inc., Seattle, WA (US)

(72) Inventors: Euan McLeod, Columbia, MO (US); Nicholas James Benson, Seattle, WA (US); Kenneth Thomas Burford, Seattle, WA (US); James Marvin Freeman, II, Mercer Island, WA (US); Stefan Christian Richter, Seattle, WA (US); Amarsingh Buckthasingh Winston, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 155 days.

This patent is subject to a terminal disclaimer.

(21) Appl. No.: 15/190,037

(22) Filed: Jun. 22, 2016

(51) Int. Cl.
*H04L 29/06* (2006.01)
*H04N 21/472* (2011.01)
*H04N 21/2387* (2011.01)

(52) U.S. Cl.
CPC ..... *H04N 21/2387* (2013.01); *H04L 65/4069* (2013.01); *H04L 65/4084* (2013.01); *H04N 21/47208* (2013.01); *H04N 21/47217* (2013.01)

(58) Field of Classification Search
CPC ............. H04N 21/812; H04N 21/8456; H04N 21/26258; H04N 21/4825; H04N 21/6125; H04N 21/6371; H04N 21/6377; H04L 65/4084; H04L 65/608; H04L 67/02; H04L 65/1069; H04L 65/80
See application file for complete search history.

(56) References Cited

U.S. PATENT DOCUMENTS

| | | | |
|---|---|---|---|
| 8,935,432 B1 * | 1/2015 | McGowan | H04L 65/605 709/248 |
| 9,038,116 B1 | 5/2015 | Knox et al. | |
| 9,549,000 B2 * | 1/2017 | Panje | H04L 65/60 |
| 9,584,557 B2 * | 2/2017 | Panje | H04L 65/60 |
| 2010/0235528 A1 | 9/2010 | Bocharov et al. | |
| 2012/0047542 A1 * | 2/2012 | Lewis | H04N 21/44016 725/97 |
| 2012/0174163 A1 * | 7/2012 | Moorthy | H04N 21/4227 725/56 |
| 2012/0254456 A1 * | 10/2012 | Visharam | H04N 21/2343 709/231 |

(Continued)

OTHER PUBLICATIONS

U.S. Appl. No. 15/190,039, filed Jun. 22, 2016, McLeod et al.

(Continued)

*Primary Examiner* — Ninos Donabed
(74) *Attorney, Agent, or Firm* — Weaver Austin Villeneuve & Sampson LLP

(57) ABSTRACT

Techniques are described for live streaming media content using on-demand manifests. Many manifest files providing playback options for different time periods of a live stream of media content can be generated and provided to viewer devices. Requests from viewer devices using the manifest files can be analyzed to determine a fragment to be provided for playback in relation to the time period of the live stream to be provided for playback.

17 Claims, 12 Drawing Sheets

(56) References Cited

U.S. PATENT DOCUMENTS

| | | | |
|---|---|---|---|
| 2012/0278495 A1* | 11/2012 | Furbeck | H04N 21/6131 709/231 |
| 2013/0091249 A1* | 4/2013 | McHugh | H04N 21/23439 709/219 |
| 2013/0163758 A1* | 6/2013 | Swaminathan | H04L 9/0819 380/259 |
| 2013/0238740 A1* | 9/2013 | Vass et al. | G06F 17/30902 709/213 |
| 2014/0150019 A1* | 5/2014 | Ma | G06Q 30/0251 725/34 |
| 2014/0195654 A1* | 7/2014 | Kiukkonen | H04W 8/00 709/220 |
| 2014/0279852 A1* | 9/2014 | Chen | G06F 16/43 707/609 |
| 2014/0281010 A1* | 9/2014 | Panje | H04L 65/60 709/231 |
| 2014/0337411 A1* | 11/2014 | Panje | H04L 65/60 709/203 |
| 2014/0379871 A1* | 12/2014 | Van Brandenburg | H04L 65/4084 709/219 |
| 2015/0088965 A1* | 3/2015 | Pakulski | H04N 21/2387 709/203 |
| 2015/0178987 A1* | 6/2015 | Hurd | G06F 1/3203 345/420 |
| 2015/0334153 A1* | 11/2015 | Koster | H04L 65/4069 709/219 |
| 2016/0366198 A1* | 12/2016 | Jennings | H04L 65/4076 |
| 2018/0034880 A1 | 2/2018 | Choi | |

OTHER PUBLICATIONS

U.S. Office Action dated Jul. 6, 2018 issued in U.S. Appl. No. 15/190,039.

U.S. Notice of Allowance dated Jan. 25, 2019 issued in U.S. Appl. No. 15/190,039.

* cited by examiner

US 10,313,721 B1

LIVE STREAMING MEDIA CONTENT USING ON-DEMAND MANIFESTS

BACKGROUND

Consumers have an ever-increasing array of options for consuming media content, in terms of the types of media content (e.g., video, audio, text, etc.), providers of the media content, and devices for consuming the media content. Media content providers are becoming increasingly sophisticated and effective at providing media content quickly and reliably to consumers.

Live streaming media content includes channels or feeds with scheduled content (e.g., premium movie channels) and live broadcasts (e.g., sporting events, news, concerts, etc.). Unlike video-on-demand (VOD) media content, live streaming media content typically does not have a distinct end point and may continue indefinitely. Unfortunately, many viewer devices are designed to work with the finite duration of VOD content.

DETAILED DESCRIPTION

Figure 1:
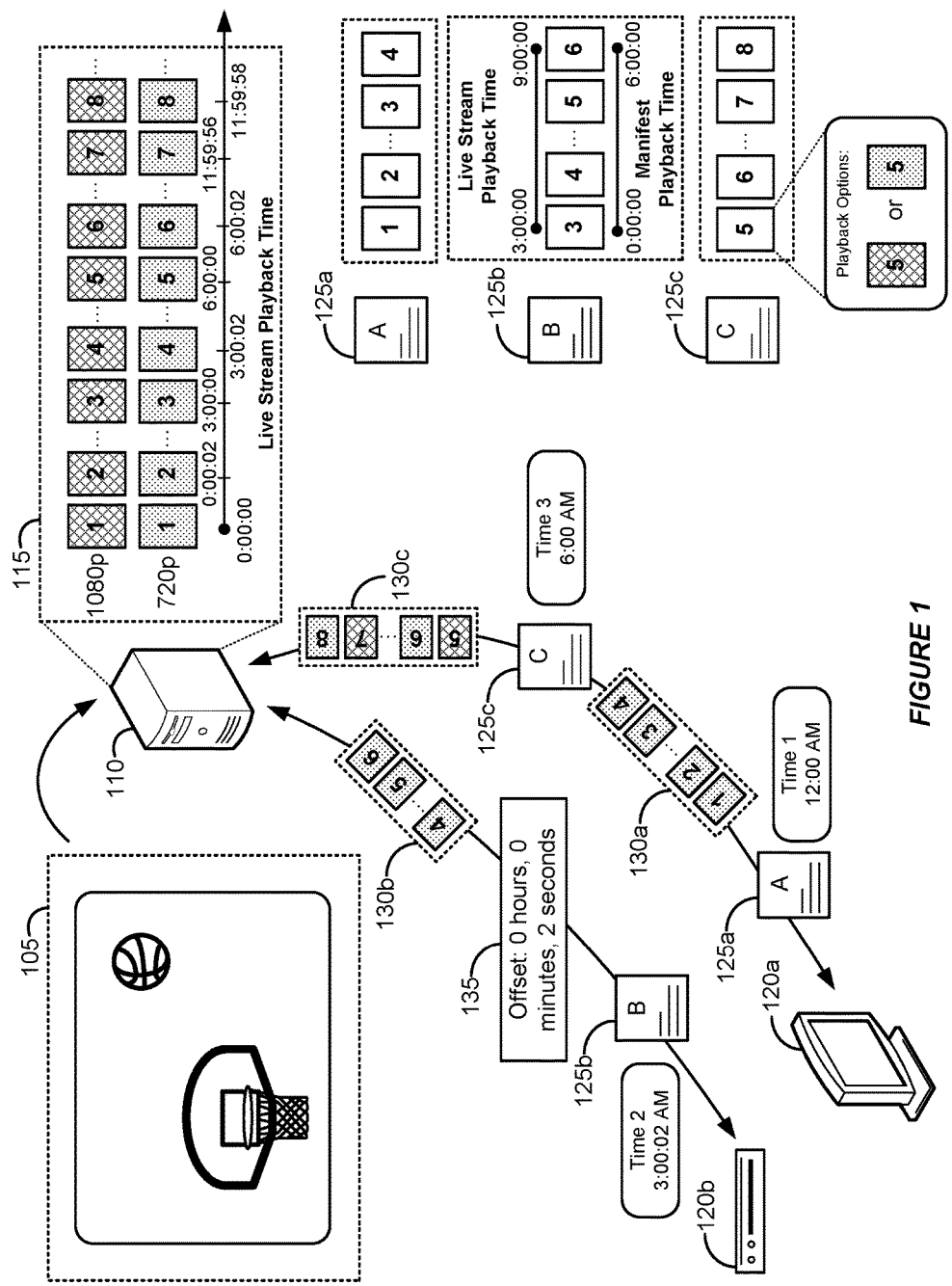
FIG. 1 illustrates an example of providing live streaming media content using video-on-demand (VOD)-style media content manifests.

This disclosure describes techniques providing a live stream of media content using manifest files traditionally used with video-on-demand (VOD) media content streaming. For example, VOD media content is usually finite in duration, with a definite beginning and end point for its playback. A viewer device on which the VOD media content is to be played back usually requests a manifest file indicating playback options detailing fragments (e.g., video, audio) of the VOD media content available for the entire duration of the playback at different quality levels.

By contrast, the duration of live stream media content can be unknown ahead of time. That is, its end point may be indefinite. As a result, a viewer device on which live stream media content is to be played back upon might receive several manifest files indicating the playback options detailing the available fragments of the live stream media content throughout the playback of the live stream. Each of the live streaming manifest files provides the playback options for a short duration.

However, some viewer devices might not be designed to function with live streaming of media content. For example, the software, firmware, or other functionality of the viewer device might be designed to work with VOD-style manifests for media content with finite durations. Unfortunately, the functionality of these viewer devices might not be able to be updated to work with live streaming manifests. As a result, live streaming of media content is unavailable for playback on many viewer devices. This decreases the available audience for live streaming of media content. Moreover, this reduces the quality of the viewer experience, as a viewer would not be able to switch live streaming of media content from device to device. For example, a viewer watching a live stream of media content on a new tablet would not be able to switch viewing the live stream to an old television.

To enable live streaming of media content for some viewer devices, VOD-style manifest files for the live stream of the media content can be generated to include data regarding fragments that are yet to be encoded and available for playback (i.e., fragments that will be available in the future as the live stream progresses). For example, as the fragments are encoded, they may have a predictable name or timing conventions that can be detailed, or predicted, ahead of time in the VOD-style manifest files. Different manifest files can also be generated with some overlap of playback options for fragments, and therefore playback time, among some of the manifest files. For example, manifest files can be generated for different six-hour time periods of playback of a live stream, with the manifest files having a three-hour overlap of the time period with another manifest file. The viewer devices are also provided with a specific manifest file based on when they requested to play back the live stream. Additionally, a request for a fragment in relation to the playback time corresponding to the VOD-style manifest file can be translated, or mapped, to a fragment in relation to the playback time of the live stream of the media content. That fragment can then be provided to the viewer device to enable playback of the live stream of the media content using VOD-style manifest files.

In another implementation, live streaming of media content can also be enabled by providing a manifest file along with a uniform resource locator (URL) to the live stream. Different viewer devices might receive different URLs based on when they request to play back the live stream. Depending on which URL is being used by the viewer device to request fragments for playback, a media server can map the request for the fragment in relation to the playback time corresponding to the VOD-style manifest file to a fragment in relation to the playback time of the live stream of the media content. For example, different offsets can be added to the playback time corresponding to the VOD-style manifest file depending on which URL is being used.

In more detail, FIG. 1 illustrates an example of providing live streaming media content using VOD-style media content manifests. As shown in FIG. 1, viewer devices 105a and 105b are electronic devices (a set-top box and a television, respectively) that are provided VOD-style manifest files 125a, 125b, and 125c to request fragments 130a, 130b, and 130c, respectively, among fragments 115 from media server 110 to enable playback of a live stream of media content 105.

As an example, in FIG. 1, media content 105 is a live event (e.g., a basketball game being broadcast live or near-live over the Internet or other networks) available for live streaming playback. As the live event is recorded, media server 110 can receive video data, encode that data at various video quality levels (e.g., 1080p and 720p in FIG. 1), and therefore, generate fragments 115. In the simplified example of FIG. 1, fragments 1-8 represent video segments of the playback of the live stream of media content 105 available at the different quality levels based on bitrates and/or resolutions for the first twelve hours of the playback of the live stream from, for example 12:00 AM to 12:00 PM). Additional fragments can be generated for the times following 12:00 PM. A sequence of fragments together enables playback of a portion of the live stream of media content 105. In FIG. 1, a single fragment might provide 2 seconds of video playback for the live stream though in other implementations the duration of playback provided by a fragment can be different. As another example, fragment 5 of fragments 115 provides two seconds of playback from 6 hours, 0 minutes, 0 seconds to 6 hours, 0 minutes, 2 seconds into the live stream. Fragments for audio can also be generated, as well as subtitles and other playback options.

Media server 110 can generate manifest data such as manifest files 125a, 125b, and 125c to allow for viewer devices 120a and 120b to view the live stream. The manifest files, or manifest data (which can be one or more markup files or other types of data structures, data provided over an API, etc.), provide playback options for the live stream by providing metadata that allows a viewer device to generate properly formatted requests for specific fragments of the media content. For example, the viewer devices can analyze the manifest file and generate a uniform resource locator (URL) directed to media server 110 and including a query string indicating the specific fragments to be provided by media server 110.

As an example, media server 110 might generate manifest file A 125a indicating playback options corresponding to fragments 1-4 of a live stream of media content 105 for viewer devices. Manifest file A 125a can be provided to viewer devices requesting playback of the live stream in its first three hours from 12:00 AM to 3:00 AM and be used for up to six hours of playback from 12:00 AM to 6:00 AM. That is, any viewer device that requests playback of the live stream from 12:00 AM to 3:00 AM can be provided manifest file A 125a so that it can view a portion of the live stream from any time between 12:00 AM to 6:00 AM. As another example, if a viewer device requests to view the live stream at 2:23 AM, then it would also receive manifest file A 125a so that it can view the live stream from 2:23 AM to 6:00 AM. Some of the fragments, e.g., from 2:23:02 AM to 6:00 AM may not exist yet, but manifest file A 125a can still provide those playback options so that the viewer device can eventually request the corresponding fragments in the future.

Other manifest files can be generated by media server 110 and used for other six hour time periods of playback and be provided based on receiving requests at different time periods. For example, manifest file B 125b can be provided to viewer devices requesting playback of the live stream in its third to sixth hours from 3:00 AM to 6:00 AM and be used for up to six hours of playback from 3:00 AM to 9:00 AM. Likewise, manifest file C 125c can be provided to viewer devices requesting playback of the live stream from 6:00 AM to 9:00 and provide playback options for the six hour time period from 6:00 AM to 12:00 PM. As a result, media server 110 can generate several manifest files providing metadata representing playback options at different time periods (e.g., 12:00 AM to 6:00 AM for manifest file A 125a, 3:00 AM to 9:00 AM for manifest file B 125b, and 6:00 AM to 12:00 PM for manifest file C 125c) for similar durations (e.g., six hours) of the playback of the live stream. Each time period of a manifest file can overlap with portions of other time periods represented by other manifest files.

Returning to the example of FIG. 1, viewer device 120a requests to view a live stream of media content 105, at time 1 corresponding to 12:00 AM. As a result, media server 110 provides manifest file A 125a to be used to request fragments 130a among fragments 115 for playback of the live stream. When manifest file A 125a is provided, only fragment 1 might be available for playback. Metadata for fragments 2-4 can be detailed in manifest file 125a, but those fragments might not exist at 12:00 AM because they are expected to be generated in the future as the live stream of media content 105 progresses during the basketball game.

Next, at 3:00:02 AM (two seconds past 3:00 AM at time 2 in FIG. 1), viewer device 120b might request to view the same live stream. In FIG. 1, this results in media server 110 providing manifest file B 125b indicating that fragments 3-6 can be requested for playback. Similar to manifest file A 125a, manifest file B 125b also provides the playback options for six hours of the live stream, and also details fragments intended to be available in the future (e.g., the fragments for 3:00:04 am to 9:00). However, manifest file B 125b provides the playback options from 3:00 AM to 9:00 AM rather than the playback options from 12:00 AM to 6:00 AM as with manifest file A 125a. Media server 110 can provide manifest file B 125b rather than manifest file A 125a because viewer device 120b is requesting to view the live stream at 3:00:02 AM, within the 3:00 AM to 6:00 AM time period, as discussed above. Since there is an overlap between the six hour time period among the two manifests, half of manifest file B 125b provides playback options for fragments including fragments 3 and 4 (similar to manifest file A 125a) while the other half of manifest file B 125b provides the playback options for fragments including fragments 5 and 6. Viewer device 120b can then use manifest file B 125b to request fragments 130b for playback of the live stream.

Media server 110 can also indicate which fragment detailed in the manifest that viewer device 120b should request to begin playback of the live stream. For example, since viewer device 120b is starting the live stream at 3:00:02 AM, it can skip the first 2 seconds (i.e., from 3:00:00 AM to 3:00:02 AM) of the playback represented by manifest file 125b so that it can start relatively closer in time to the live event being recorded. As discussed later herein, media server 110 can determine the progress of the live playhead of the live stream playback or the time that viewer device 120b requested to play back the live stream and use that to provide an offset to viewer device 120b. The offset is used such that viewer device 120b can start playback of the live stream by requesting the fragment corresponding to 3:00:02 AM (0 hours, 0 minutes, 2 seconds into the manifest playback time, as discussed later herein) rather than 3:00:00 AM. In FIG. 1, this results in media server 110 providing playback offset data 135 to viewer device 120b. This allows for fragment 3 to be skipped and viewer device 120b can begin playback of the live stream by initially requesting fragment 4.

At time 3 at 6:00 AM, if viewer device 120a continues to watch the live stream of media content 105 until the end of manifest file A 125a at 6:00 AM, then it can request a new manifest file C 125c to provide the playback options for another six-hour time period from 6:00 AM to 12:00, as previously discussed. For example, when the video player of viewer device 120a reaches the end of a manifest file, it might contact media server 110 for a new manifest file. As a result, manifest file C 125c can be provided and used to request fragments 5-8 130c of fragments 115 to continue the playback of the live stream.

Additionally, when media server 110 receives a request for a fragment from viewer devices 120*a* and 120*b*, it can translate the request to determine the specific fragment of fragments 115 of the live stream being requested. For example, manifest files A 125*a*, B 125*b*, and C 125*c* are VOD-style manifest files in which the first fragment is indicated as being at the beginning of the duration of the playback. As an example, as previously discussed regarding manifest file B 125*b*, a six hour time period of playback options of the live stream from 3:00 AM to 9:00 AM (or 3 hours, 0 minutes, 0 seconds to 9 hours, 0 minutes, 0 seconds of playback from the beginning of the live stream) is detailed (indicated as live stream playback time in FIG. 1). This means that manifest file B 125*b* does not provide playback options from the beginning of the live stream. Rather, the first fragment detailed in manifest file B 125*b* provides playback three hours into the live stream and the last fragments ends nine hours into it. However, VOD-style manifest files usually start at the beginning of the playback of media content, for example, with a playback time, or time code, such as 0 hours, 0 minutes, 0 seconds. In other implementations, the time code can be a time range for the fragment. In some implementations, a byte code or byte range can also be used. Subsequent fragments are requested by incrementing the time code.

As an example, if the fragments provide two seconds of playback, then the second fragment to be requested would have a time code associated with 0 hours, 0 minutes, 2 seconds. The final fragment would correspond to playback from 5 hours, 58 minutes, 58 seconds to 6 hours, 0 minutes, 0 seconds (indicated as manifest playback time for manifest file B 125*b* in FIG. 1). As a result, viewer device 120*b* can provide a request using manifest file B 125*b*, for example, by requesting a fragment at 0 hours, 0 minutes, 0 seconds (e.g., the first fragment represented by manifest file B 125*b*). Media server 110 can receive that request indicating a fragment with respect to the manifest playback time and determine that the requested fragment at 0 hours, 0 minutes, 0 seconds using manifest file B 125*b* is a request for fragment 5 of fragments 115 at 6 hours, 0 minutes, 0 seconds of the live stream playback time. That is, the time or time ranges of the fragments being requested from viewer device 120*a* using manifest file B 125*b* are offset from the beginning of the live stream by six hours. As a result, media server 110 can then provide the proper fragment of the live stream using the offset.

Figure 2:
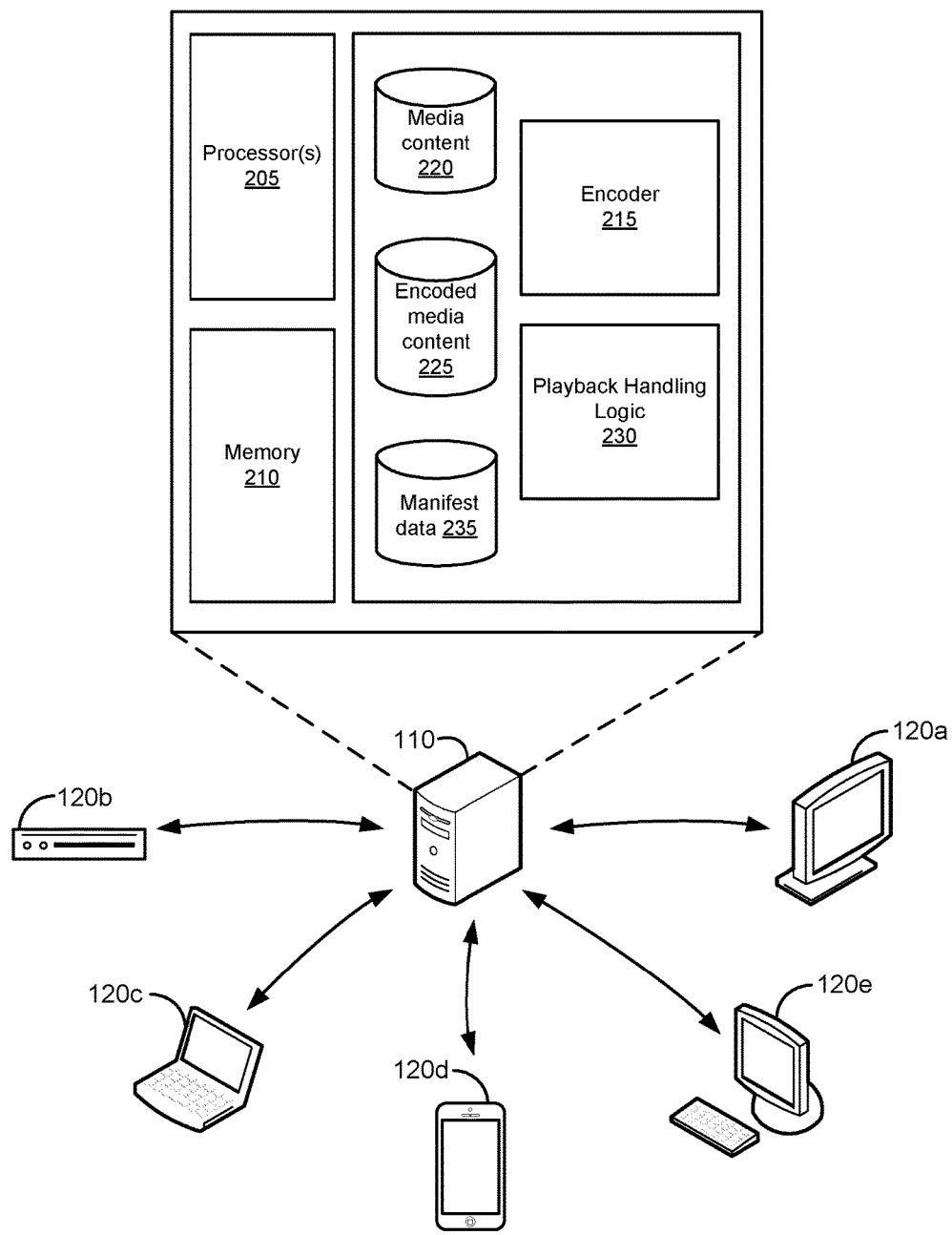
FIG. 2 illustrates an example of a computing environment providing live streaming media content using VOD media content manifests.

FIG. 2 illustrates an example of a computing environment providing live streaming media content using VOD media content manifests. The computing environment of FIG. 2 includes media server 110 that can be used to provide manifest data to viewer devices 120*a-e* so that they can request and receive fragments of live streaming media content. Viewer devices 120*a-e* can include smartphones, televisions, laptop computers, desktop computers, set-top boxes, video game consoles, tablets, wearable devices, virtual reality headsets, and other electronic devices.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 110 may be part of a content delivery system that conforms to any of a wide variety of architecture. The functionality and components of media server 110 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on a viewer device), integrated into a separate app from another entity, implemented in an edge server or content server of a CDN, a server of an ISP, etc. In some implementations, media server 110 can include one service using one or more servers to provide manifest files to viewer devices 120*a-e* and they may request fragments from another service using one or more of the same or other servers of media server 110, such as an edge server of a CDN, based on the manifest provided by the first service.

In FIG. 2, viewer devices 120*a-e* includes various types of logic used to implement a video player to provide playback of media content. Viewer devices 120*a-e* can include one or more processors, memory, a display, and other hardware components or circuits to request manifest files and fragments of media content to store in a playback buffer. For example, viewer devices 120*a-e* can include processors that can execute stored instructions in memory to implement the techniques disclosed herein.

Media server 110 includes one or more processors 205, memory 210, and other hardware components or circuits to provide manifest file 110 to viewer device 105 so that it can request fragments for playback of a live stream. For example, processors 205 and memory 210 can receive and store video and audio data corresponding to the recording of a live event in media content 220 and implement encoder 215 to generate fragments 115 at various quality levels and store those fragments as encoded media content 225 based on media content 220. Playback handling logic 230 can generate several manifest files and store those manifest files in manifest data 235. Playback handling logic 230 can provide a manifest file to a viewer device upon request for a manifest file, receive requests for fragments, perform any mapping as previously discussed, and then provide the corresponding fragments to the viewer device. As a result, processors 205 can execute stored instructions in memory 210 to implement the techniques disclosed herein.

Figure 3A:
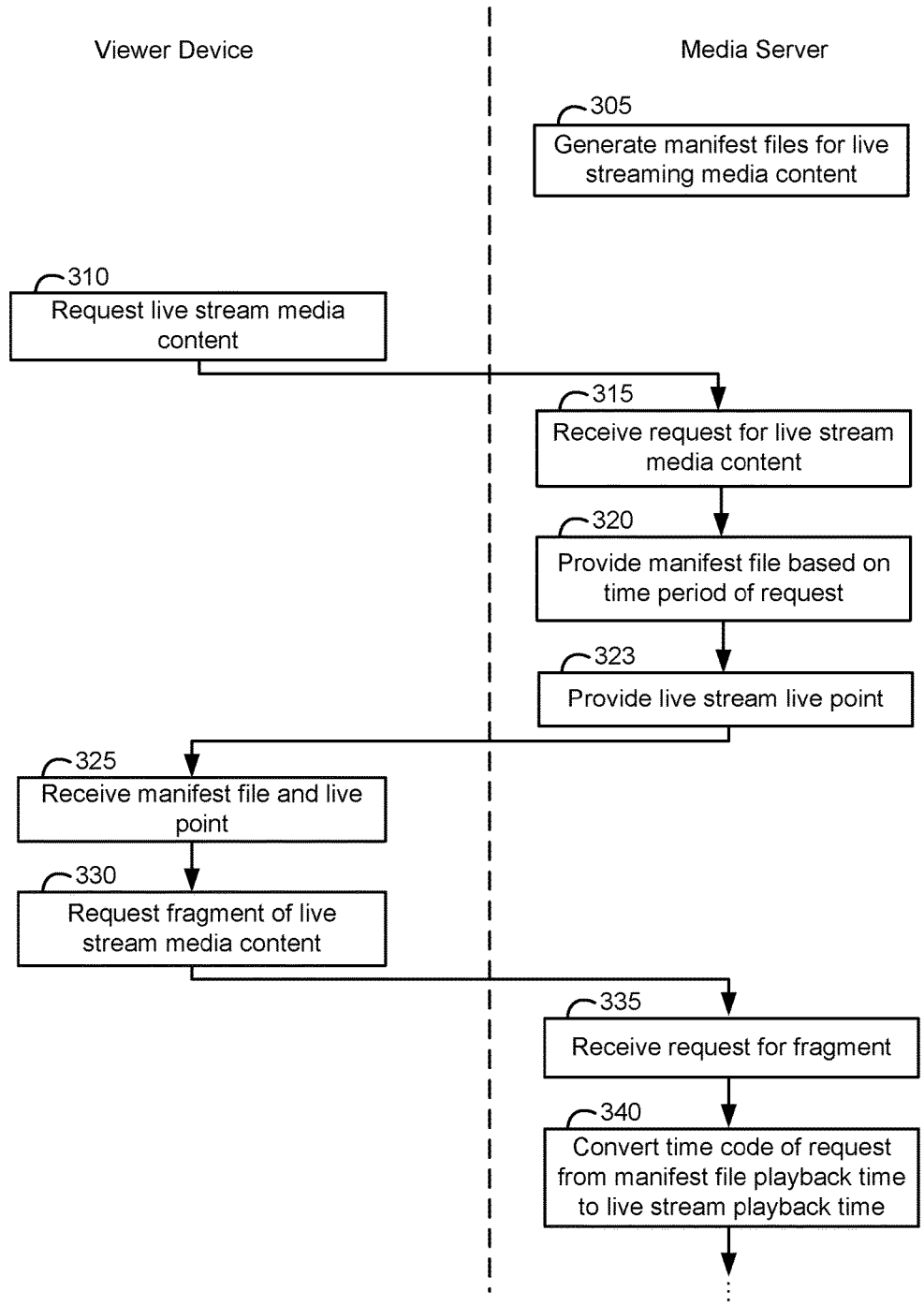
FIGS. 3A and 3B are a flowchart illustrating live streaming media content using VOD media content manifests.
Figure 3B:
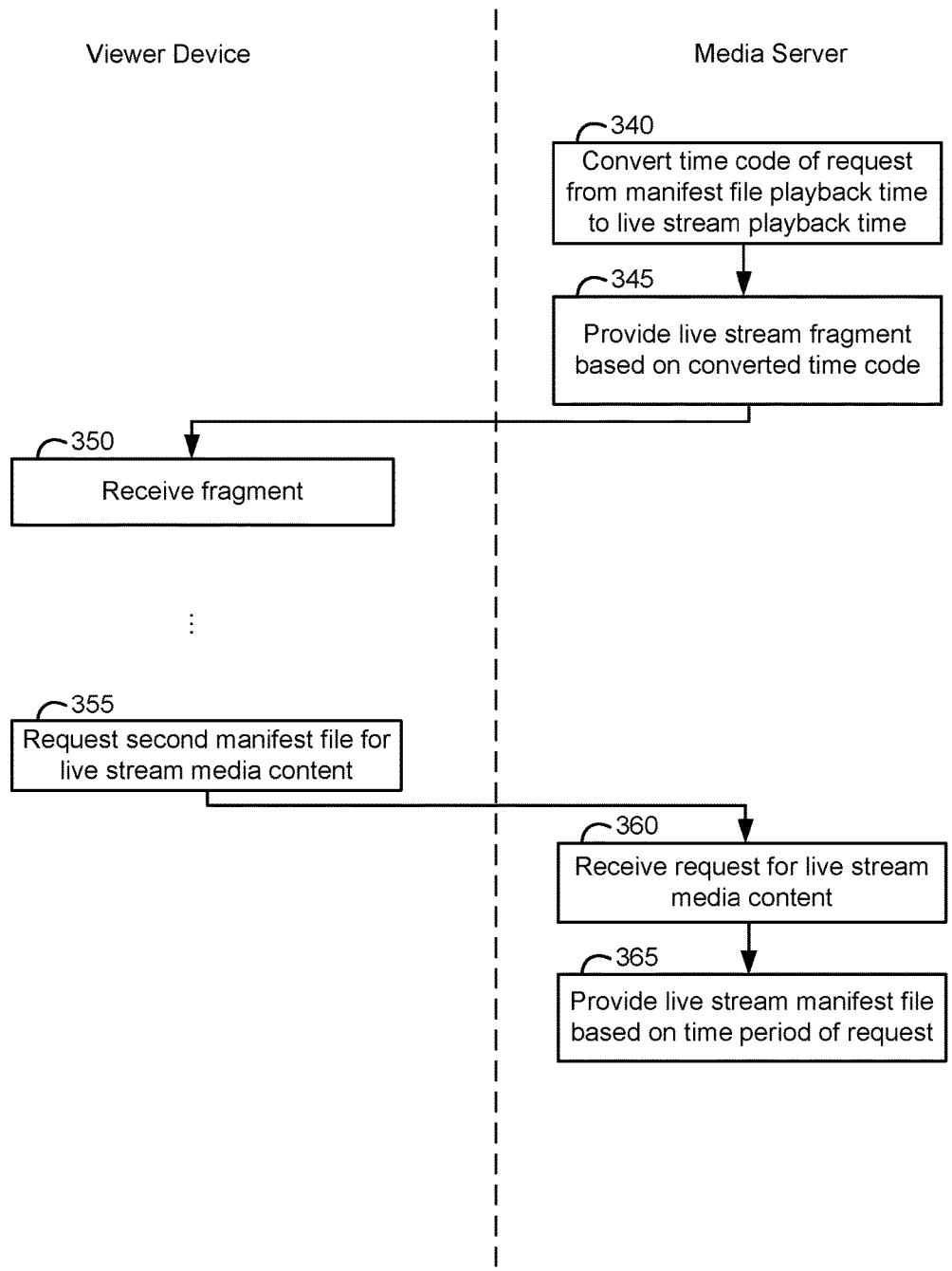

A specific implementation will now be described with reference to FIG. 1, the computing environment of FIG. 2, and the flow diagrams of FIGS. 3A and 3B. In FIG. 3A, a media server can generate VOD-style manifest files for live streaming media content (305). As previously discussed, media server 110 can generate manifest files providing playback options for different time periods of the playback of the live stream. Some of the time periods can overlap with the time periods of other manifest files. For example, in FIG. 4A, manifest files A-E can be generated covering playback options for different portions of the playback of the live stream. Manifest A provides the playback options for fragments 1-4 of the live stream of the media content, which might be the first six hours of the live stream. Manifest B provides the playback options for fragments 3-6 which might be for the third hour to the ninth hour of the live stream. Since both manifests A and B provide the playback options for fragments 3 and 4, this means that they overlap in terms of the playback options for a certain duration or time of the live stream playback. For example, in the simplified example of FIG. 4A, fragments 3 and 4 are fragments that should be played back within the third hour to sixth hour (or 3:00:00 AM to 6:00:00 AM with the example with the live stream beginning at 12:00:00 AM) of playback of the live stream. Manifest files C, D, and E also cover different six hour time periods with overlaps with different manifest files. For example, manifest file C overlaps with half of the time period of manifest file B and half of the time period of manifest file D. Manifest file B does not overlap with manifest file D.

Figure 6:
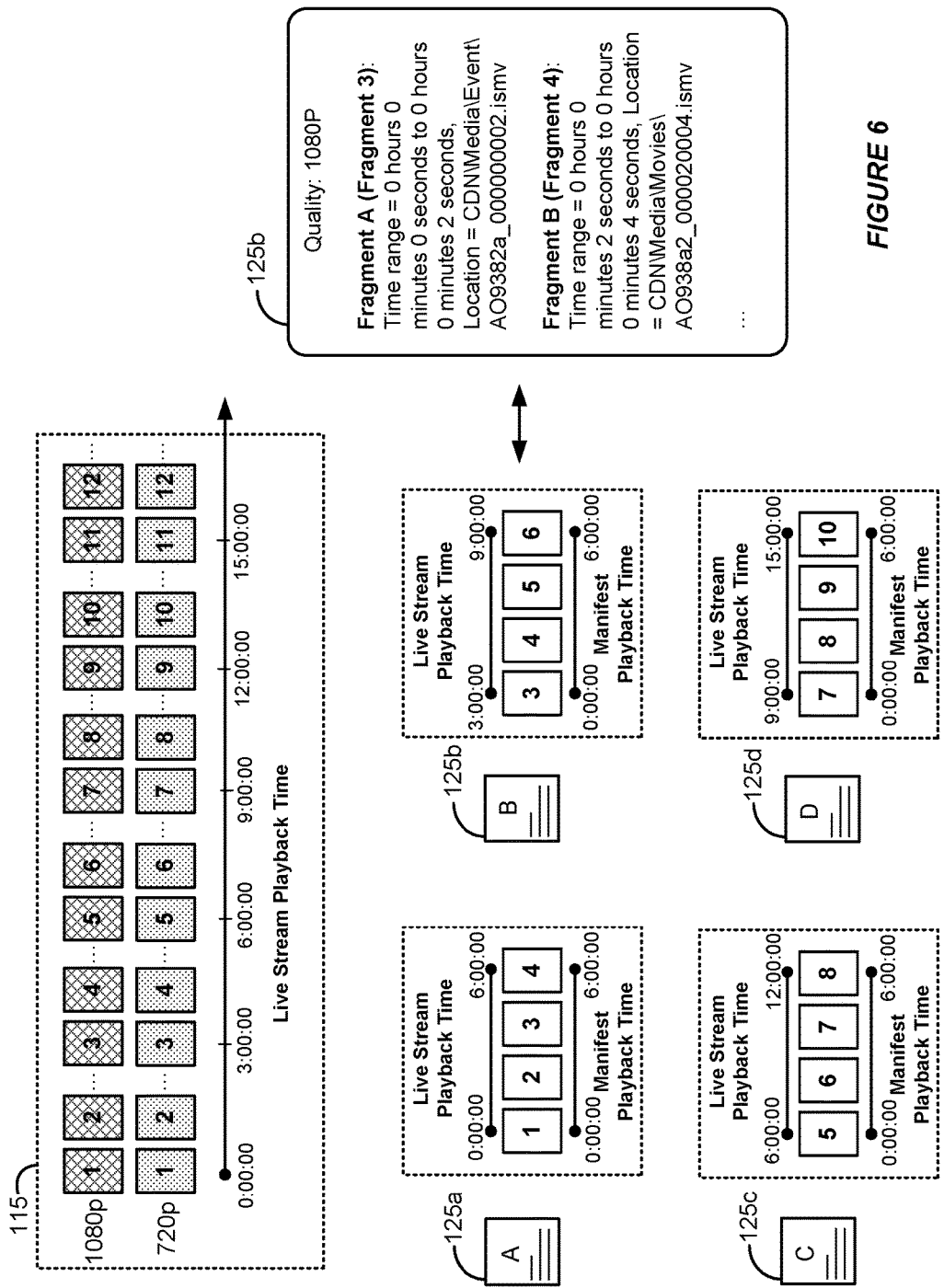
FIG. 6 illustrates examples of generated VOD-style manifest files for live streaming media content.

FIG. 6 illustrates examples of generated VOD-style manifest files for live streaming media content. In FIG. 6, the live stream playback time represents the time period of the live stream for which the manifest file provides playback options based on FIG. 4A. However, as previously discussed, the manifest files in FIG. 6 are all VOD-style manifest files that provide playback options as if each of the manifest files starts from the beginning of playback of media content and ends after six hours. For example, in FIG. 6, manifest playback time for each of the manifest files is for the same six hour time period from hour zero. Manifest file B 125b indicates that a first fragment (fragment A) can be requested to provide playback for the first two seconds of the media content. However, the first fragment to be requested using manifest file B 125b should be for fragment 3 of the live stream media content in fragments 115, which provides the first two seconds of playback from the three hour point into the live stream playback time. Each of the manifest files represent the fragments as being available from the beginning (zero hours) to six hours even though, with the exception of manifest file A 125a, there is an offset in terms of the playback time from the perspective of the manifest file and the actual playback time from the perspective of the live stream. For example, manifest file B 125b has a three hour offset, manifest file C 125c has a six hour offset, and manifest file D 125d has a nine hour offset. As discussed later herein, the offsets can be determined and used by media server 110 to provide the proper fragment in relation to the live stream rather than the manifest file.

In some implementations, the manifests are generated at the same time, for example, before the live stream begins. Some of the fragments may already be existing, and some might be expected to be generated in the future. This can be accomplished, for example, because the fragments can be expected to have a particular name (e.g., increment numbers, letters, etc.) as they are generated. In other implementations, a manifest can be generated when the playback is about to reach or has reached a time period for a new manifest file. For example, manifest file A can be generated and playback of the live stream can begin. Eventually, at two hours, fifty-nine minutes, and zero seconds in the live stream, manifest file B can be generated and provided to viewer devices requesting to view the live stream starting at three hours into the playback.

Figure 4A:
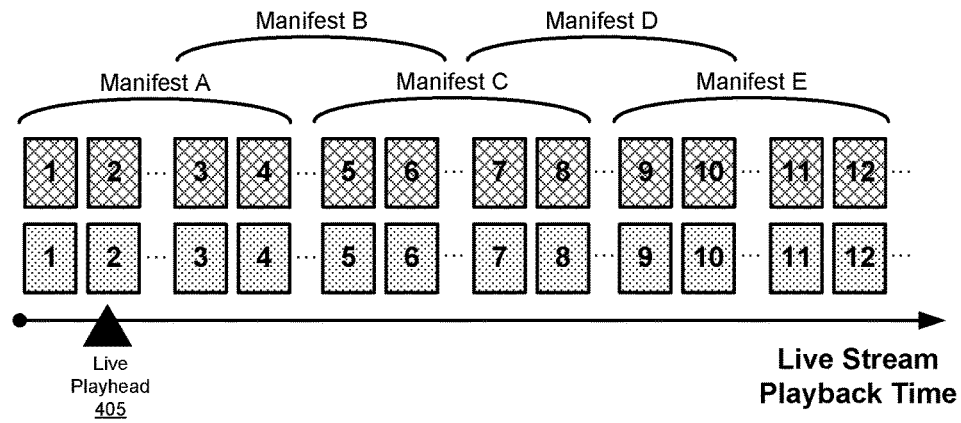
FIGS. 4A-C illustrate examples of providing manifest files.
Figure 4B:
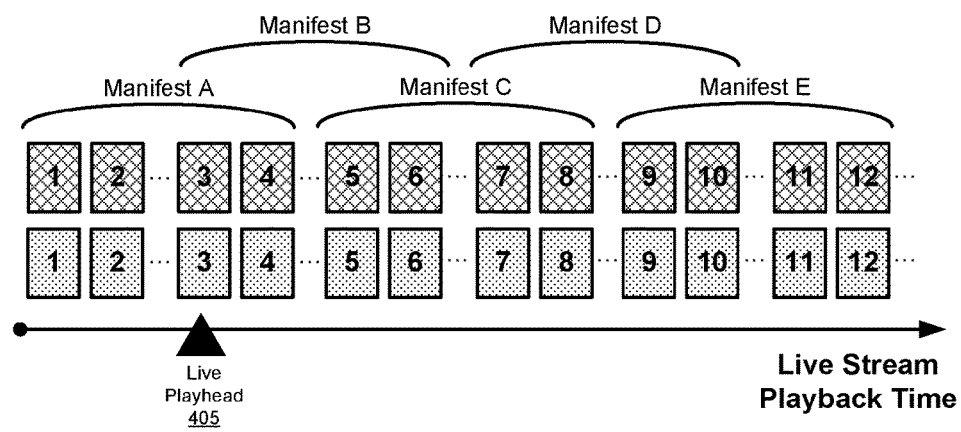
Figure 4C:
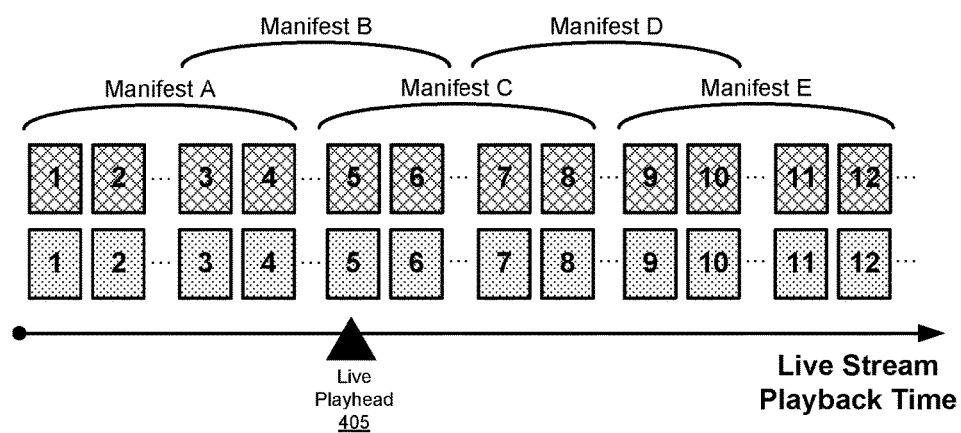

Next, in FIG. 3A, a viewer device can request media content, for example, by selecting playback of a live stream of the media content, such as a live sports event, in a web browser or software program, and therefore, request manifest data (e.g., a manifest file) indicating playback options for the live stream media content (310). Media server 110 can receive that request (315) and provide a manifest file to play back the live stream of the media content based on a time period of the request (320). FIGS. 4A-C illustrate providing manifest files. As previously discussed, the timing of the request for the manifest file can be used to determine which manifest file should be provided to the viewer device to enable live playback of the media content using a VOD-style manifest file. For example, in FIG. 4A, live playhead 405 represents the latest fragment of media content 105 available. That is, live playhead 405 is the latest fragment that has been recorded and encoded, and therefore, available for viewer devices to request. As a result, live playhead 405 also represents the current playback time of the live stream. For example, in FIG. 4A, live playhead 405 is at fragment 2, which might be the fragment that begins the 2 seconds to 4 seconds of playback of the live stream playback time from when it was first started. If the viewer device joins at this time, then manifest A would be provided because it is within the first half of the six hour time period (i.e., within the first three hours) of playback options detailed in manifest A. As another example, in FIG. 4B, if live playhead 405 advances to the time corresponding to fragment 3 (e.g., as the basketball game progresses) and the viewer device requests a manifest file at this time, then manifest B would be provided because fragment 3 is in the last half of the duration of the six hour time period of manifest A, but in the first half of manifest B. If live playhead 405 then advances to fragment 5 in FIG. 4C, then manifest file C would be provided for similar reasons.

Figure 7A:
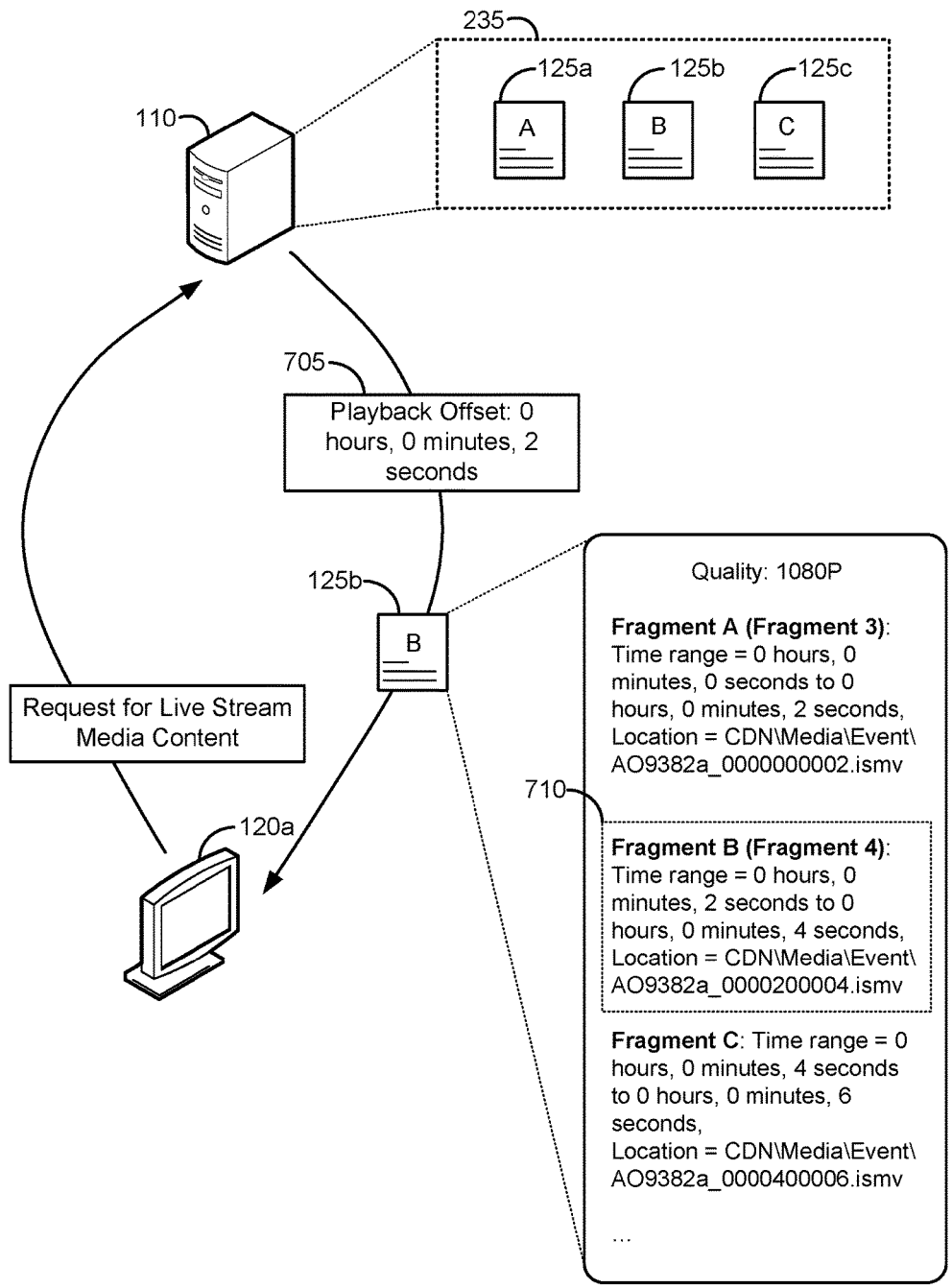
FIGS. 7A and 7B illustrate an example of a media server providing a fragment for playback of a live stream.

Additionally, the live stream live point indicating an offset representing the position or timing of live playhead 405 can also be provided to a viewer device (323). For example, the viewer device can receive manifest B 125b when live playhead 405 is at 3 hours, 0 minutes, 2 seconds (e.g., fragment 4 is the latest fragment available). This results in media server 110 generating an offset representing that the live streaming playback is currently at 3 hours, 0 minutes, 2 seconds. The offset can be provided to the viewer device so that it can join the live stream at a more current point rather than starting behind. As an example, in FIG. 7A, viewer device 120a can request playback of the live stream at 3 hours, 0 minutes, 2 seconds into it and receives playback offset data 705 indicating that the playback of the live stream is currently 0 hours, 0 minutes, 2 seconds into the fragments that have their playback options detailed in manifest file B 125b. In some implementations, the offset might indicate a time before the position of live playhead 405 to provide some buffering for the viewer device.

The viewer device receives the manifest file and live point representing the offset (325) and then requests a fragment (330). For example, in FIG. 7A, viewer device 120a uses playback offset data 705 to determine that manifest metadata 710 of manifest file B 125b should be used to request fragment B to begin playback of the live stream. This is because it provides playback starting from 0 hours, 0 minutes, and 2 seconds into the playback time detailed in the manifest, as indicated by playback offset data 705. This fragment B as detailed in manifest file B 125b would be a request for fragment 4 of fragments 115 stored by media server 110 since fragment 4 offers playback at 3 hour, 0 minutes, and 0 seconds to 3 hours, 0 minutes, and 2 seconds into the live stream.

Media server 110 receives the request (335) and can convert the time code of the request from the manifest file playback time to the live stream playback time (340). As previously discussed, VOD-style manifest files have an expected beginning and end to the playback of the entire media content, and therefore, each of the manifest files provided by media server 110 indicate that the first fragment detailed in the manifest file (fragment A) would start at 0 hours, 0 minutes, 0 seconds and the last fragment would end at 6 hours, 0 minutes, 0 seconds. By contrast, the fragments of the live stream represent a portion of a longer playback time that can be much longer than six hours. As a result, media server 110 can translate the request for a fragment based on the playback time as indicated in the manifest file to the playback time as indicated in the playback time of the live stream, and provide that fragment to the viewer device based on the translation (345).

Figure 5:
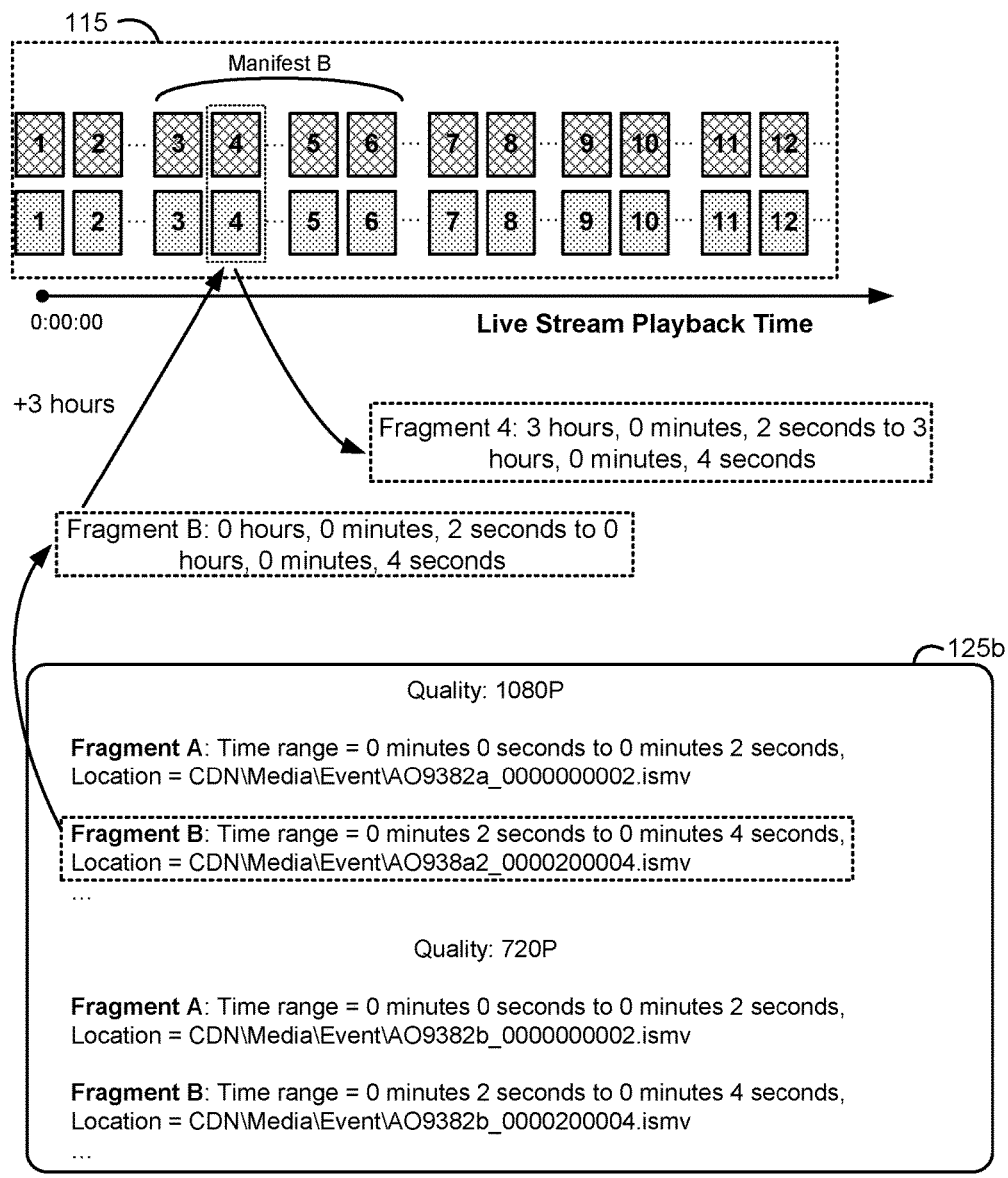
FIG. 5 illustrates mapping a request of a fragment based on a VOD manifest to a live stream fragment.

For example, FIG. 5 illustrates mapping a request of a fragment based on a VOD manifest to a live stream fragment. In FIG. 5, if a viewer device was provided manifest file B 125b and it requested fragment B as detailed therein, this would be a request for a fragment starting at 0 hours, 0 minutes, and 2 seconds and providing playback until 0 hours, 0 minutes, and 4 seconds. However, manifest file B 125b provides the playback options for fragments 115 of the live stream from three hours to nine hours into the live stream. That is, manifest file B 125b is offset from the beginning of the live stream by three hours. Therefore, a three hour offset can be added to the time code of fragment B, resulting in the request for fragment B at 0 hours, 0 minutes, 2 seconds being identified by media server 110 as a request for fragment 4 of fragments 115, which provides playback of the live stream at 3 hours, 0 minutes, 2 seconds to 3 hours, 0 minutes, 4 seconds. The offset to be applied can be determined based on the time code of the request. For example, in FIG. 1, both manifest files A 130a and B 130b can request fragment 4 from fragments 115. However, they would have different time codes, and therefore, media server 110 can correlate the time code as being provided from either manifest file A 130a or manifest file B 130b.

Figure 7B:
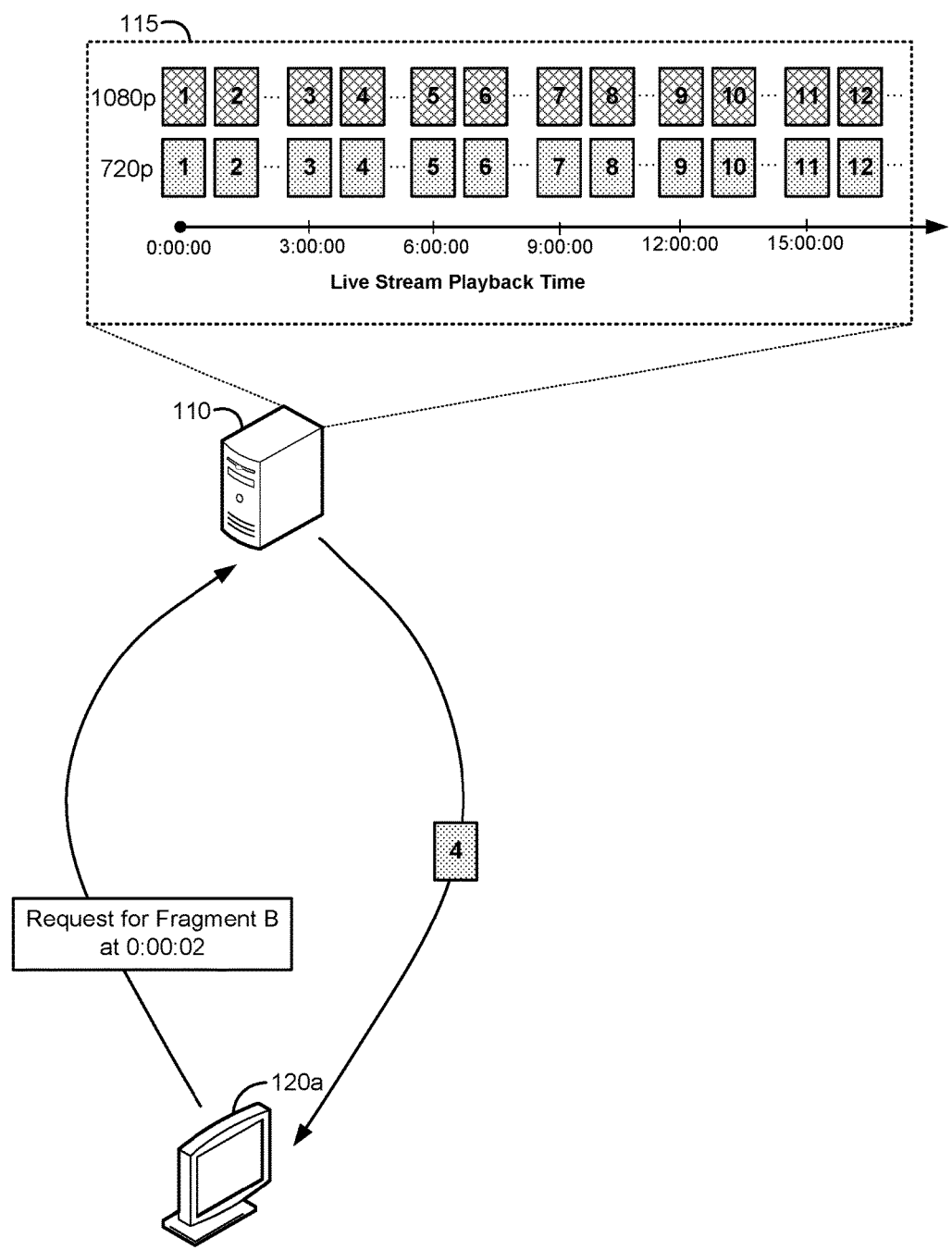

In FIG. 7B, since manifest file B 125b was provided to viewer device 120a and it requests fragment B that begins playback of 0 hours, 0 minutes, 2 seconds based on the playback time of the manifest file. This results in media server 110 providing fragment 4 from fragments 115 that provides playback at 3 hours, 0 minutes, 2 seconds of the live stream playback time.

The viewer device can then receive the fragment (350) and store it in a buffer in memory for playback. The viewer device can then request a subsequent fragment using the manifest file, for example, requesting the fragment that begins playback from 0 hours, 0 minutes, 4 seconds to 0 hours, 0 minutes, 6 seconds in the playback time of the manifest file and be provided the fragment corresponding to the playback time of the live stream. Eventually, the last fragment detailed in the manifest file can be requested. When this occurs, the viewer device can request a second manifest file for playback of the live stream (355). The media server receives that request (360) and provides a second manifest file based on the time period of the request. For example, as previously discussed, manifest file C 125c can be provided if the end of manifest file A 125a was reached. This would provide the viewer device with an additional six hours of playback options for the live stream.

Figure 8:
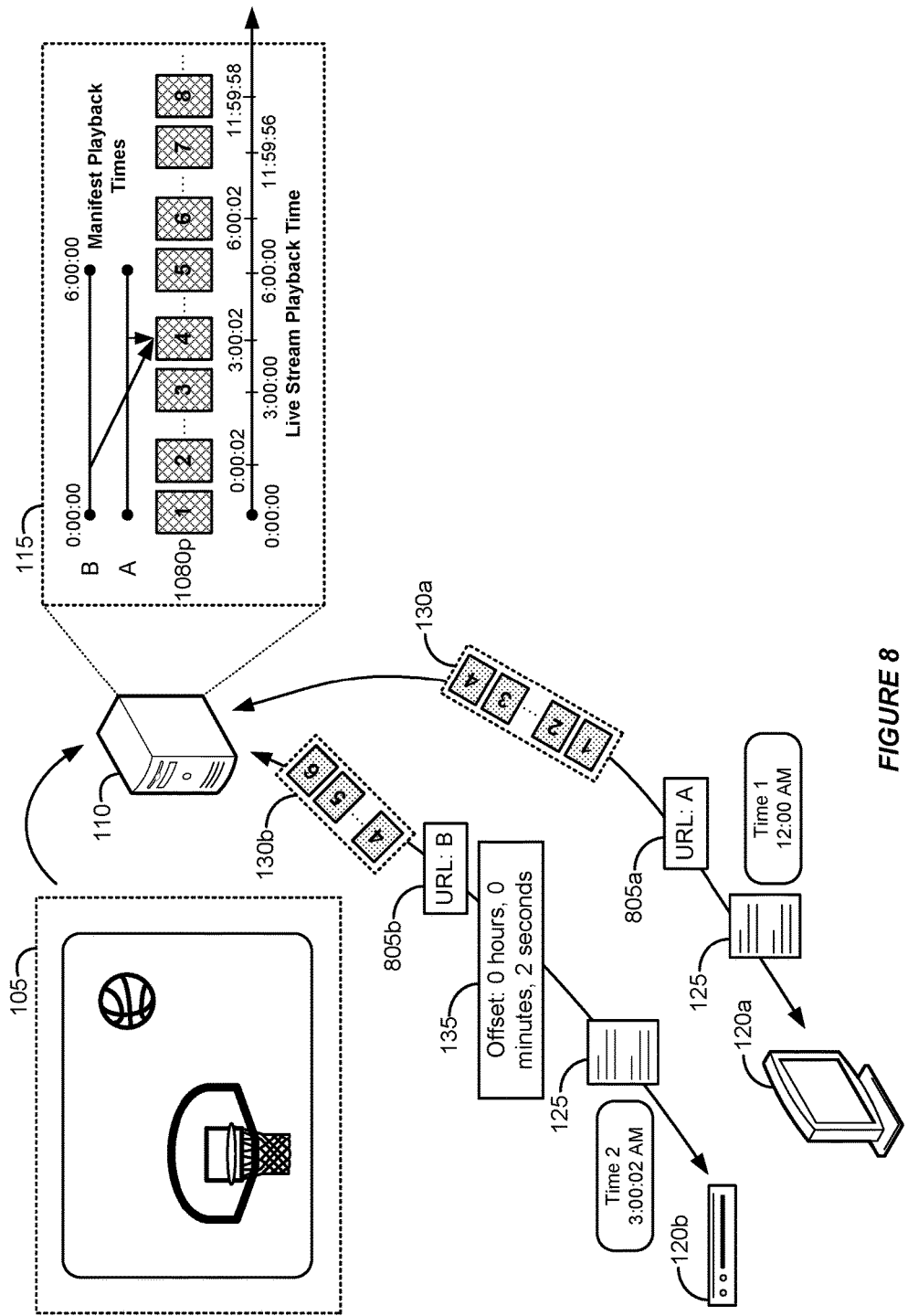
FIG. 8 illustrates another example of providing live streaming media content using video-on-demand (VOD)-style media content manifests.

FIG. 8 illustrates another example of providing live streaming media content using video-on-demand (VOD)-style media content manifests. In FIG. 8, a manifest file can be provided to multiple viewer devices, but the viewer devices can be provided a particular uniform resource locator (URL) used to request fragments for playback based on the time of the request to begin playback of the live stream. When a viewer device uses the URL to request a fragment with a time code using the manifest file, the media server can apply an offset based on the URL to translate the time code from the request using the manifest file to the live stream playback time.

For example, in FIG. 8, viewer device 120a requests playback of a live stream and receives manifest file 125 from media server 110. Additionally, URL A 805a can also be provided to viewer device 120a. In some implementations, URL A 805a can be detailed within manifest file 125 along with the playback options, as previously discussed. In some implementations, manifest file 125 and URL A 805a may be provided separately (e.g., in separate files).

Different URLs can be provided based on when a viewer device requests to play back the live stream. For example, in FIG. 8, since viewer device 120a requests to play back the live stream between 12:00 AM and 3:00 AM (e.g., the first three hours of the live stream), then URL A 805a can be provided to viewer device 120a. Manifest file 125, also provided to viewer device 120a, provides six hours of playback options, similar to the example of FIG. 1. By contrast, since viewer device 120b requests to being playback of the live stream at 3:00:02 AM (e.g., between 3:00 AM and 6:00 AM during the second three hours of the live stream), media server 110 can provide URL B 805b. The different URLs are provided because, as discussed below, the viewer devices would be at different points within the duration of the manifest playback time (e.g., the six hours provided by the respective manifest) even though they are playing back the same live stream. When viewer device 120a requests a new manifest file at 6:00 AM, the same manifest file 125 can be provided, as well as the same URL A 805a. In some implementations, the same two URLs can be alternatively used. However, in other implementations, a new URL can be provided each time and the media server can keep track of which URL provides which type of offset.

As a result, URL A 805a is provided to a viewer device requesting a manifest file every other three hour period. For example, in FIG. 8, viewer devices requesting to play back the live stream would receive URL A 805a if the request is made from 12:00 AM to 3:00 AM, 6:00 AM to 9:00 AM, 12:00 PM to 3:00 PM, and so on. URL B 805b would be provided to viewer devices requesting play back of the live stream during the other time periods from 3:00 AM to 6:00 AM, 9:00 AM to 12:00 PM, 3:00 PM to 6:00 PM, and so on. Manifest file 125 is provided to the devices regardless of which time period is being used to make that request. The metadata in manifest file 125 can be used to select a time code to generate a formatted request for a fragment, as previously discussed. Moreover, offset 135 can still be provided and used to begin play back of the live stream closer to the live playhead, as previously discussed. However, as discussed below, the request for fragments using URL A 805a or URL B 805b can result in media server 110 determining which of the alternating time periods that the request for the play back of the live stream started in, and therefore, how to map the time code of the request from a fragment in relation to the manifest file to a fragment in relation to the playback time of the live stream of the media content. This allows for media server 110 to account for viewer devices 120a and 120b being at different points within the duration of the playback time of their manifest files even though both are watching the live stream at relatively the same time.

Using URL A 805a and the manifest data detailed in manifest file 125, fragments 130a can be requested for playback of the live stream by viewer device 120a. For example, the different URLs might point to different file names that can be mapped by media server 110 to a particular fragment of the live stream, similar to the other examples disclosed herein. That is, URL A 805a and URL B 805b might point to different locations (e.g., different file names), but media server 110 can map the requests to specific fragments 115 of the same live stream. As a result, the different URL A 805a and URL B 805b can represent identifiers for different offsets to be applied by media server 110.

For example, in FIG. 8, if URL A 805a is used to request a fragment (along with a time code based off of manifest file 125). Media server 110 can determine how much of an offset to add to the time code based on the URL used in the request. If a viewer device requests a fragment using URL A 805a, this would result in a different offset than if a device requests a fragment using URL B 805b. For example, as depicted in FIG. 8, fragment 4 of fragments 115 can be mapped to by adding a different offset to the time code used in the request depending on whether URL A 805a (associated with the manifest playback time labeled "A") or URL B 805b (associated with the manifest playback time labeled "B") was used to make that request. As a result, media server 110 can provide the proper fragments 130a and 130b to viewer devices 120a and 120b, respectively.

Figure 9A:
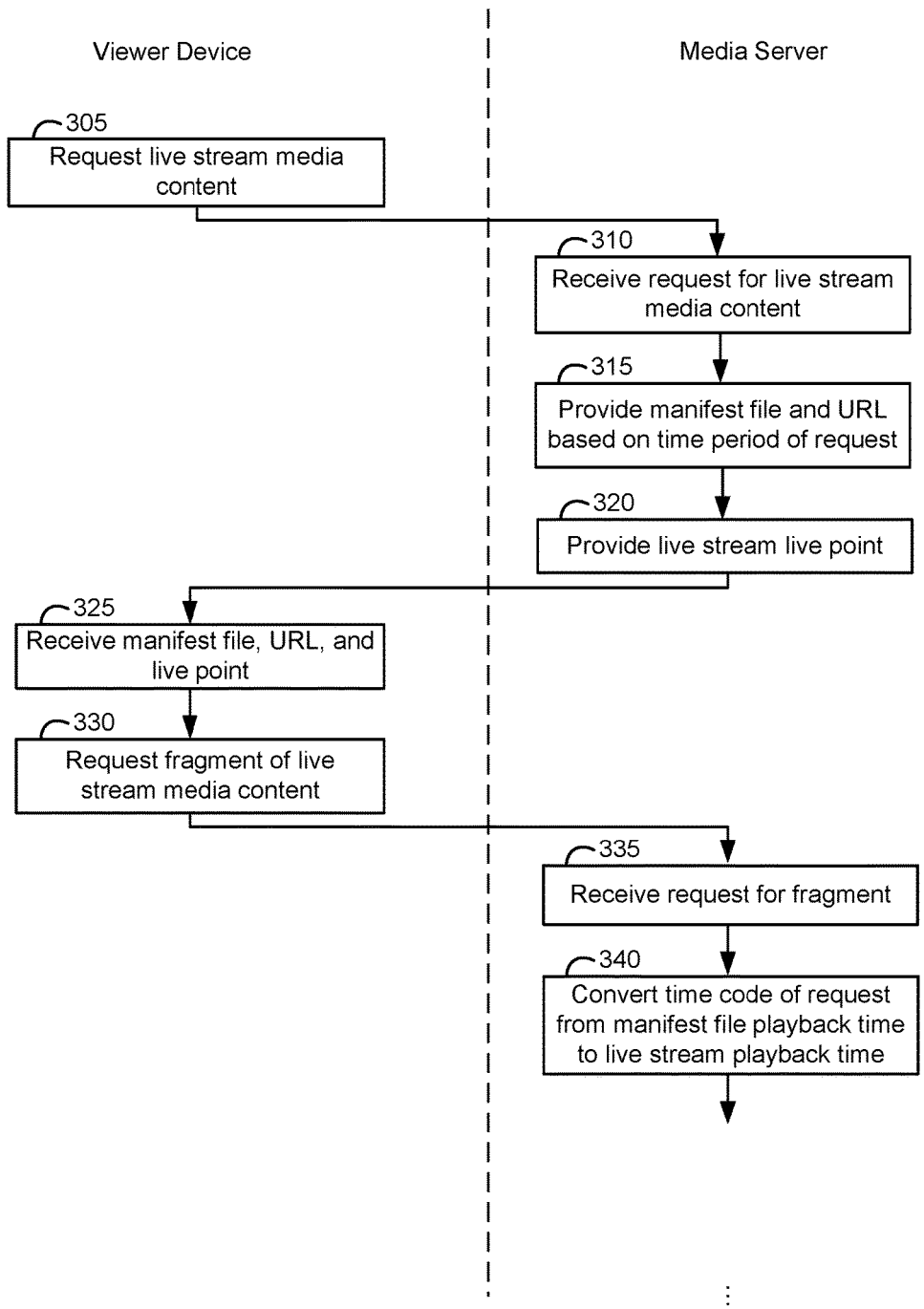
FIGS. 9A and 9B are a flowchart illustrating live streaming media content using VOD media content manifests.
Figure 9B:
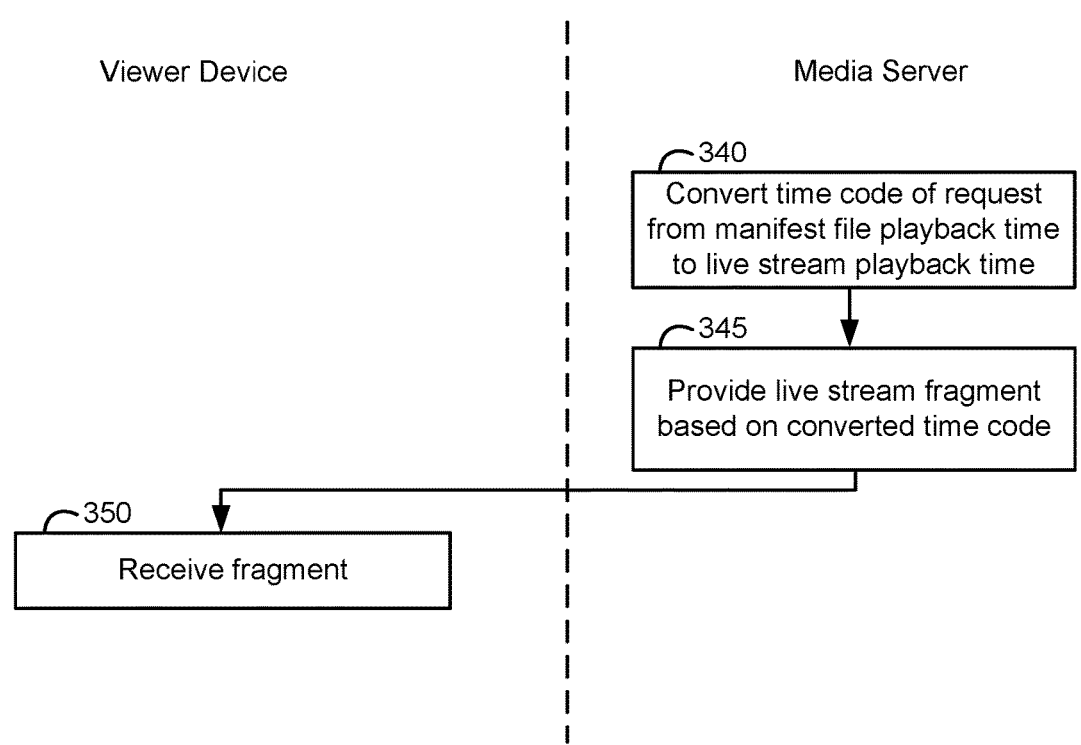

FIGS. 9A and 9B are a flowchart illustrating live streaming media content using VOD media content manifests. In FIG. 9A, a viewer device can request media content by selecting playback of a live stream of the media content (305). A media server receives the request (310) and provides a manifest file and URL based on the time period of the request (315). For example, as previously discussed, different URLs can be provided to viewer devices based on which alternating time period the request was received within. The live stream live point can also be provided (320).

The viewer device receives the manifest file, URL, and live point (325) and then requests a fragment of the live stream of the media content (330). The media server then receives that request (335) and converts the time code of the request from the manifest file playback time to the live stream playback time (340). For example, an offset can be added to the time code based on the URL used to make the request. As a result, a live stream fragment based on the converted, or mapped, time code can then be provided for playback (345). The viewer device can then receive that fragment (350) and store it in a buffer for playback.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

In some implementations, a computer implemented method can include: generating, by a media server, a first manifest file for a live stream of media content, the first manifest file indicating fragments of the live stream of the media content available for playback, the fragments detailed as providing playback within a first manifest time period representing a time duration of playback of the fragments detailed in the first manifest file and corresponding to a first portion of a playback time period of the live stream; receiving, by the media server, a first request from a first viewer device for playback of the live stream of the media content; providing, by the media server, the first manifest file to the first viewer device; providing, by the media server, a first playback offset to the first viewer device, the first playback offset indicating a fragment detailed in the first manifest file to start playback of the live stream at a time corresponding to a live playhead representing a current playback time into the playback time period of the live stream of the media content; receiving, by the media server, a first request from the first viewer device for a fragment based on the first playback offset and the first manifest file, the first request indicating a first fragment time corresponding to the fragment indicated in the first request and within the first manifest time period; converting, by the media server, the first fragment time within the first manifest time period to a first live stream fragment time within the playback time period of the live stream; and providing, by the media server, a first live stream fragment to the first viewer device for playback of the live stream, the first live stream fragment corresponding to the first live stream fragment time.

In some implementations, the computer implemented method can include: generating, by a media server, a second manifest file for the live stream of media content, the second manifest file indicating fragments of the live stream of the media content available for playback, the fragments detailed as providing playback within a second manifest time period representing a time duration of playback of the fragments detailed in the second manifest file and corresponding to a second portion of the playback time period of the live stream, the first portion and the second portion of the playback time period being different; receiving, by the media server, a second request from a second viewer device for playback of the live stream of the media content; and providing, by the media server, the second manifest file to the second viewer device.

In some implementations, the first portion and the second portion overlap in relation to the playback time period of the live stream.

In some implementations, converting the first fragment time within the first manifest time period to a first live stream fragment time within the playback time period of the live stream includes adding a time offset based on the first viewer device requesting the first manifest file to the first fragment time to determine the first live stream fragment time.

In some implementations, a system can include: one or more processors and memory configured to: generate a first manifest data for a live stream of media content, the first manifest data indicating fragments of the live stream of the media content available for playback within a first manifest time period representing a time duration of playback of the fragments; provide the first manifest data to a first viewer device; receive a first request from the first viewer device for a fragment detailed in the first manifest data, the first request indicating a first fragment time corresponding to the fragment indicated in the first request and within the first manifest time period; determine a first live stream fragment time within a playback time period of the live stream based on the first fragment time within the first manifest time period; and provide a first live stream fragment to the first viewer device, the first live stream fragment corresponding to the first live stream fragment time.

In some implementations, the one or more processors and memory can be configured to: provide a playback offset to the first viewer device, the playback offset indicating a fragment detailed in the first manifest data to start playback of the live stream at a time corresponding to a live playhead representing a current playback time into the playback time period of the live stream of the media content, and wherein the first fragment time is based on the playback offset.

In some implementations, the one or more processors and memory can be configured to: generate a second manifest data for a live stream of media content, the second manifest data indicating fragments of the live stream of the media content available for playback within a second manifest time period representing a time duration of playback of the fragments, wherein the fragments of the first manifest data correspond to a first portion of the playback time period of the live stream, the fragments of the second manifest data correspond to a second portion of the playback time of the live stream, the first portion and the second portion being different portions of the playback time of the live stream; and provide the second manifest data to the second viewer device.

In some implementations, the first portion and the second portion overlap in relation to the playback time period of the live stream.

In some implementations, the first manifest data is provided based on receiving a first request from the first viewer device at a first request time, the second manifest data is provided based on receiving a second request from the second viewer device at a second request time, the first request time at a time during the playback time period of the live stream before the overlap between the first portion and the second portion, the second request time at a time during the overlap.

In some implementations, determining the first live stream fragment time includes adding a time offset to the first fragment time, the time offset based on the first viewer device playing back the live stream using the first manifest data.

In some implementations, the fragments detailed in the first manifest data include fragments available for playback following a time corresponding to a live playhead representing a current playback time into the playback time period of the live stream of the media content.

In some implementations, the first manifest time period is less than the playback time period of the live stream.

In some implementations, a computer program product can comprise one or more non-transitory computer-readable media having computer instructions stored therein, the computer program instructions being configured such that, when executed by one or more computing devices, the computer program instructions cause the one or more computing devices to: generate a first manifest data for a live stream of media content, the first manifest data indicating fragments of the live stream of the media content available for playback within a first manifest time period representing a time duration of playback of the fragments; provide the first manifest data to a first viewer device; receive a first request from the first viewer device for a fragment detailed in the first manifest data, the first request indicating a first fragment time corresponding to the fragment indicated in the first request and within the first manifest time period; determine a first live stream fragment time within a playback time period of the live stream based on the first fragment time within the first manifest time period; and provide a first live stream fragment to the first viewer device, the first live stream fragment corresponding to the first live stream fragment time.

In some implementations, the computer program instructions can cause the one or more computing devices to: provide a playback offset to the first viewer device, the playback offset indicating a fragment detailed in the first manifest data to start playback of the live stream at a time corresponding to a live playhead representing a current playback time into the playback time period of the live stream of the media content, and wherein the first fragment time is based on the playback offset.

In some implementations, the computer program instructions can cause the one or more computing devices to: generate a second manifest data for a live stream of media content, the second manifest data indicating fragments of the live stream of the media content available for playback within a second manifest time period representing a time duration of playback of the fragments, wherein the fragments of the first manifest data correspond to a first portion of the playback time period of the live stream, the fragments of the second manifest data correspond to a second portion of the playback time of the live stream, the first portion and the second portion being different portions of the playback time of the live stream; and provide the second manifest data to the second viewer device.

In some implementations, the first portion and the second portion overlap in relation to the playback time period of the live stream.

In some implementations, the first manifest data is provided based on receiving a first request from the first viewer device at a first request time, the second manifest data is provided based on receiving a second request from the second viewer device at a second request time, the first request time at a time during the playback time period of the live stream before the overlap between the first portion and the second portion, the second request time at a time during the overlap.

In some implementations, determining the first live stream fragment time includes adding a time offset to the first fragment time, the time offset based on the first viewer device playing back the live stream using the first manifest data.

In some implementations, the fragments detailed in the first manifest data include fragments available for playback following a time corresponding to a live playhead representing a current playback time into the playback time period of the live stream of the media content.

In some implementations, the first manifest time period is less than the playback time period of the live stream.

In some implementations, a computer implemented method can include: receiving, by a media server, a first request from a first viewer device for playback of a live stream of media content; providing, by the media server, a manifest file to the first viewer device, the manifest file indicating fragments of the live stream of the media content available for playback, the fragments detailed as providing playback within a manifest time period representing a time duration of playback of the fragments detailed in the manifest file; providing, by the media server, a first location identifier for the live stream of the media content; providing, by the media server, a first playback offset to the first viewer device, the first playback offset indicating a fragment detailed in the manifest file to start playback of the live stream at a time corresponding to a live playhead representing a current playback time into a playback time period of the live stream of the media content; receiving, by the media server, a first request from the first viewer device for a fragment corresponding to the first location identifier and based on the first playback offset and the manifest file, the first request indicating a first fragment time corresponding to the fragment indicated in the first request and within the manifest time period; converting, by the media server, the first fragment time within the first manifest time period to a first live stream fragment time within the playback time period of the live stream based on the first location identifier; and providing, by the media server, a first live stream fragment to the first viewer device for playback of the live stream, the first live stream fragment corresponding to the first live stream fragment time.

In some implementations, the computer implemented method can include: receiving, by the media server, a second request from a second viewer device for playback of the live stream of the media content; providing, by the media server, the manifest file to the second viewer device; providing, by the media server, a second location identifier for the live stream of the media content, the second location identifier being different than the first location identifier; providing, by the media server, a second playback offset to the first viewer device, the second playback offset indicating a fragment detailed in the manifest file to start playback of the live stream at a time corresponding to the live playhead of the live stream of the media content; receiving, by the media server, a second request from the second viewer device for a fragment corresponding to the second location identifier and based on the second playback offset and the manifest file, the second request indicating a second fragment time corresponding to the fragment indicated in the second request and within the manifest time period; converting, by the media server, the second fragment time within the manifest time period to a second live stream fragment time within the playback time period of the live stream based on the second location identifier; and providing, by the media server, a second live stream fragment to the first viewer device for playback of the live stream, the second live stream fragment corresponding to the second live stream fragment time.

In some implementations, converting the first fragment time within the manifest time period to the first live stream fragment time within the playback time period of the live stream includes adding a first time offset to the first fragment time, the first time offset based on the first location identifier.

In some implementations, converting the second fragment time within the manifest time period to the second live stream fragment time within the playback time period of the live stream includes adding a second time offset to the second fragment time, the second time offset based on the second location identifier, the first time offset and the second time offset being different.

In some implementations, a system can include: one or more processors and memory configured to: receive a first request from a first viewer device for a fragment detailed in manifest data, the first request indicating a first fragment time corresponding to the fragment indicated in the first request and within a manifest time period representing a time duration of playback of the fragments detailed in the manifest data; determine a first live stream fragment time within a playback time period of a live stream based on the first fragment time within the manifest time period; and provide a first live stream fragment to the first viewer device, the first live stream fragment corresponding to the first live stream fragment time.

In some implementations, the one or more processors and memory can be configured to: provide the manifest data to the first viewer device; and provide a playback offset to the first viewer device, the playback offset indicating a fragment detailed in the manifest data to start playback of the live stream at a time corresponding to a live playhead representing a current playback time into the playback time period of the live stream of the media content, and wherein the first fragment time is based on the playback offset.

In some implementations, the first request references a first location identifier representing a location for the fragments of the live stream, and wherein determining the first live stream fragment time includes adding a first time offset to the first fragment time, the first time offset based on the first location identifier.

In some implementations, the one or more processors and memory can be configured to: receive a second request from a second viewer device for a fragment detailed in manifest data and referencing a second location identifier, the second request indicating a second fragment time corresponding to the fragment indicated in the second request and within the manifest time period representing the time duration of playback of the fragments detailed in the manifest data; determine a second live stream fragment time within the playback time period of the live stream based on the second fragment time within the manifest time period, wherein the determination includes adding a second time offset to the second fragment time, the second time offset based on the second location identifier, the first time offset and the second time offset being different; and provide a second live stream fragment to the second viewer device, the second live stream fragment corresponding to the second live stream fragment time.

In some implementations, the first location identifier and the second location identifier are different uniform resource locators (URLs).

In some implementations, the first live stream fragment and the second live stream fragment provide playback of a same portion of the live stream.

In some implementations, the fragments detailed in the manifest data include fragments available for playback following a time corresponding to a live playhead representing a current playback time into the playback time period of the live stream of the media content.

In some implementations, the manifest time period is less than the playback time period of the live stream.

In some implementations, a computer program product can include one or more non-transitory computer-readable media having computer instructions stored therein, the computer program instructions being configured such that, when executed by one or more computing devices, the computer program instructions cause the one or more computing devices to: receive a first request from a first viewer device for a fragment detailed in manifest data, the first request indicating a first fragment time corresponding to the fragment indicated in the first request and within a manifest time period representing a time duration of playback of the fragments detailed in the manifest data; determine a first live stream fragment time within a playback time period of a live stream based on the first fragment time within the manifest time period; and provide a first live stream fragment to the first viewer device, the first live stream fragment corresponding to the first live stream fragment time.

In some implementations, the computer program instructions can cause the one or more computing devices to: provide the manifest data to the first viewer device; and provide a playback offset to the first viewer device, the playback offset indicating a fragment detailed in the manifest data to start playback of the live stream at a time corresponding to a live playhead representing a current playback time into the playback time period of the live stream of the media content, and wherein the first fragment time is based on the playback offset.

In some implementations, the first request references a first location identifier representing a location for the fragments of the live stream, and wherein determining the first live stream fragment time includes adding a first time offset to the first fragment time, the first time offset based on the first location identifier.

In some implementations, the computer program instructions can cause the one or more computing devices to: receive a second request from a second viewer device for a fragment detailed in manifest data and referencing a second location identifier, the second request indicating a second fragment time corresponding to the fragment indicated in the second request and within the manifest time period representing the time duration of playback of the fragments detailed in the manifest data; determine a second live stream fragment time within the playback time period of the live stream based on the second fragment time within the manifest time period, wherein the determination includes adding a second time offset to the second fragment time, the second time offset based on the second location identifier, the first time offset and the second time offset being different; and provide a second live stream fragment to the second viewer device, the second live stream fragment corresponding to the second live stream fragment time.

In some implementations, the first location identifier and the second location identifier are different uniform resource locators (URLs).

In some implementations, the first live stream fragment and the second live stream fragment provide playback of a same portion of the live stream.

In some implementations, the fragments detailed in the manifest data include fragments available for playback following a time corresponding to a live playhead representing a current playback time into the playback time period of the live stream of the media content.

In some implementations, the manifest time period is less than the playback time period of the live stream.

What is claimed is:

1. A computer implemented method comprising:
generating, by a media server, a first manifest file for a live stream of media content, the first manifest file indicating fragments of the live stream of the media content available for playback, the fragments represented as providing playback within a first manifest time period representing a static time duration of playback of the fragments represented in the first manifest file and corresponding to a first portion of a playback timeline of the live stream, the first manifest file having an initial fragment with a time code representing zero, the initial fragment of the first manifest corresponding to a live stream fragment with a non-zero time code in the playback timeline of the live stream;
receiving, by the media server, a first request from a first viewer device for playback of the live stream of the media content;
providing, by the media server, the first manifest file to the first viewer device;
providing, by the media server, a first playback offset to the first viewer device, the first playback offset indicating a fragment represented in the first manifest file to start playback of the live stream at a time corresponding to a live playhead representing a current playback time into the playback timeline of the live stream of the media content;
receiving, by the media server, a first request from the first viewer device for a fragment based on the first playback offset and the first manifest file, the first request indicating a first fragment time corresponding to the fragment indicated in the first request and within the first manifest time period;
determining, by the media server, that the first viewer device is playing back the live stream using the first manifest file;
determining, by the media server, a static time offset to the first fragment time based on determining that the first viewer device is playing back the live stream using the first manifest file;
converting, by the media server, the first fragment time within the first manifest time period to a first live stream fragment time within the playback timeline of the live stream based in part on adding the static time offset to the first fragment time;
providing, by the media server, a first live stream fragment to the first viewer device for playback of the live stream, the first live stream fragment corresponding to the first live stream fragment time;
receiving, by the media server, a subsequent request from the first viewer device for a subsequent fragment represented in the first manifest file, the subsequent request indicating a subsequent fragment time corresponding to the subsequent fragment indicated in the subsequent request and within the first manifest time period, wherein the first fragment time and the subsequent fragment time correspond to different times within the first manifest time period;
determining, by the media server, a subsequent live stream fragment time within the playback timeline of the live stream based on the subsequent fragment time within the first manifest time period based in part on adding the static time offset to the subsequent fragment time; and
providing, by the media server, a subsequent live stream fragment to the first viewer device, the subsequent live stream fragment corresponding to the subsequent live stream fragment time.

2. The computer implemented method of claim 1, further comprising:
generating, by a media server, a second manifest file for the live stream of media content, the second manifest file indicating fragments of the live stream of the media content available for playback, the fragments represented as providing playback within a second manifest time period representing a static time duration of playback of the fragments represented in the second manifest file and corresponding to a second portion of the playback timeline of the live stream, the first portion and the second portion of the playback timeline being different;
receiving, by the media server, a second request from a second viewer device for playback of the live stream of the media content; and providing, by the media server, the second manifest file to the second viewer device.

3. The computer implemented method of claim 2, wherein the first portion and the second portion overlap in relation to the playback timeline of the live stream.

4. A system comprising:
one or more processors and memory configured to:
generate first manifest data for a live stream of media content, the first manifest data indicating fragments of the live stream of the media content available for playback within a first manifest time period representing a static time duration of playback of the fragments, the first manifest data having an initial fragment with a time code representing zero, the initial fragment of the first manifest data corresponding to a live stream fragment with a non-zero time code in a playback timeline of the live stream;
provide the first manifest data to a first viewer device;
receive a first request from the first viewer device for a fragment represented in the first manifest data, the first request indicating a first fragment time corresponding to the fragment indicated in the first request and within the first manifest time period;
determine that the first viewer device is playing back the live stream using the first manifest data;
determine a static time offset to the first fragment time based on determining that the first viewer device is playing back the live stream using the first manifest data;
determine a first live stream fragment time within the playback timeline of the live stream based on the first fragment time within the first manifest time period based in part on adding the static time offset to the first fragment time;
provide a first live stream fragment to the first viewer device, the first live stream fragment corresponding to the first live stream fragment time;
receive a subsequent request from the first viewer device for a subsequent fragment represented in the first manifest data, the subsequent request indicating a subsequent fragment time corresponding to the subsequent fragment indicated in the subsequent request and within the first manifest time period, wherein the first fragment time and the subsequent fragment time correspond to different times within the first manifest time period;
determine a subsequent live stream fragment time within the playback timeline of the live stream based on the subsequent fragment time within the first manifest time period based in part on adding the static time offset to the subsequent fragment time; and
provide a subsequent live stream fragment to the first viewer device, the subsequent live stream fragment corresponding to the subsequent live stream fragment time.

5. The system of claim 4, the one or more processors and memory configured to:
provide a playback offset to the first viewer device, the playback offset indicating a fragment represented in the first manifest data to start playback of the live stream at a time corresponding to a live playhead representing a current playback time into the playback timeline of the live stream of the media content, and wherein the first fragment time is based on the playback offset.

6. The system of claim 4, the one or more processors and memory configured to:

generate a second manifest data for a live stream of media content, the second manifest data indicating fragments of the live stream of the media content available for playback within a second manifest time period representing a static time duration of playback of the fragments, wherein the fragments of the first manifest data correspond to a first portion of the playback timeline of the live stream, the fragments of the second manifest data correspond to a second portion of the playback time of the live stream, the first portion and the second portion being different portions of the playback time of the live stream; and
provide the second manifest data to a second viewer device.

7. The system of claim 6, wherein the first portion and the second portion overlap in relation to the playback timeline of the live stream.

8. The system of claim 7, wherein the first manifest data is provided based on receiving a first request from the first viewer device at a first request time, the second manifest data is provided based on receiving a second request from the second viewer device at a second request time, the first request time at a time during the playback timeline of the live stream before the overlap between the first portion and the second portion, the second request time at a time during the overlap.

9. The system of claim 4, wherein the fragments represented in the first manifest data include fragments available for playback following a time corresponding to a live playhead representing a current playback time into the playback timeline of the live stream of the media content.

10. The system of claim 4, wherein the first manifest time period is less than the playback timeline of the live stream.

11. A computer program product comprising one or more non-transitory computer-readable media having computer instructions stored therein, the computer program instructions being configured such that, when executed by one or more computing devices, the computer program instructions cause the one or more computing devices to:
generate first manifest data for a live stream of media content, the first manifest data indicating fragments of the live stream of the media content available for playback within a first manifest time period representing a static time duration of playback of the fragments, the first manifest data having an initial fragment with a time code representing zero, the initial fragment of the first manifest data corresponding to a live stream fragment with a non-zero time code in a playback timeline of the live stream;
provide the first manifest data to a first viewer device;
receive a first request from the first viewer device for a fragment represented in the first manifest data, the first request indicating a first fragment time corresponding to the fragment indicated in the first request and within the first manifest time period;
determine that the first viewer device is playing back the live stream using the first manifest data;
determine a static time offset to the first fragment time based on determining that the first viewer device is playing back the live stream using the first manifest data;
determine a first live stream fragment time within the playback timeline of the live stream based on the first fragment time within the first manifest time period based in part on adding the static time offset to the first fragment time;

provide a first live stream fragment to the first viewer device, the first live stream fragment corresponding to the first live stream fragment time;

receive a subsequent request from the first viewer device for a subsequent fragment represented in the first manifest data, the subsequent request indicating a subsequent fragment time corresponding to the subsequent fragment indicated in the subsequent request and within the first manifest time period, wherein the first fragment time and the subsequent fragment time correspond to different times within the first manifest time period;

determine a subsequent live stream fragment time within the playback timeline of the live stream based on the subsequent fragment time within the first manifest time period based in part on adding the static time offset to the subsequent fragment time; and provide a subsequent live stream fragment to the first viewer device, the subsequent live stream fragment corresponding to the subsequent live stream fragment time.

12. The computer program product of claim 11, wherein the computer program instructions cause the one or more computing devices to:

provide a playback offset to the first viewer device, the playback offset indicating a fragment represented in the first manifest data to start playback of the live stream at a time corresponding to a live playhead representing a current playback time into the playback timeline of the live stream of the media content, and wherein the first fragment time is based on the playback offset.

13. The computer program product of claim 11, wherein the computer program instructions cause the one or more computing devices to:

generate a second manifest data for a live stream of media content, the second manifest data indicating fragments of the live stream of the media content available for playback within a second manifest time period representing a static time duration of playback of the fragments, wherein the fragments of the first manifest data correspond to a first portion of the playback timeline of the live stream, the fragments of the second manifest data correspond to a second portion of the playback time of the live stream, the first portion and the second portion being different portions of the playback time of the live stream; and provide the second manifest data to a second viewer device.

14. The computer program product of claim 13, wherein the first portion and the second portion overlap in relation to the playback timeline of the live stream.

15. The computer program product of claim 14, wherein the first manifest data is provided based on receiving a first request from the first viewer device at a first request time, the second manifest data is provided based on receiving a second request from the second viewer device at a second request time, the first request time at a time during the playback timeline of the live stream before the overlap between the first portion and the second portion, the second request time at a time during the overlap.

16. The computer program product of claim 11, wherein the fragments represented in the first manifest data include fragments available for playback following a time corresponding to a live playhead representing a current playback time into the playback timeline of the live stream of the media content.

17. The computer program product of claim 11, wherein the first manifest time period is less than the playback timeline of the live stream.

* * * * *